US007451224B1

(12) United States Patent
Stamler (10) Patent No.: US 7,451,224 B1
(45) Date of Patent: Nov. 11, 2008

(54) METHOD AND APPARATUS FOR AUTOMATICALLY SYNCHRONIZING A UNIQUE IDENTIFIER OF A NETWORK DEVICE

(75) Inventor: Arnold Stamler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 861 days.

(21) Appl. No.: 10/422,231

(22) Filed: Apr. 23, 2003

(51) Int. Cl.
*G06F 9/46* (2006.01)

(52) U.S. Cl. .............................. 709/228; 705/7; 705/26

(58) Field of Classification Search ................ 709/217, 709/245, 224–229; 455/419, 411; 370/395, 370/410, 402
See application file for complete search history.

(56) References Cited

U.S. PATENT DOCUMENTS

| | | | |
|---|---|---|---|
| 5,050,070 A | | 9/1991 | Chastain et al. |
| 5,150,464 A | | 9/1992 | Sidhu et al. |
| 5,274,771 A | | 12/1993 | Hamilton et al. |
| 5,351,040 A | | 9/1994 | Matsuura et al. |
| 5,778,323 A | | 7/1998 | Dorenbosch et al. |
| 5,787,246 A | | 7/1998 | Lichtman et al. |
| 5,948,077 A | | 9/1999 | Choi et al. |
| 5,999,975 A | * | 12/1999 | Kittaka et al. ............... 709/224 |
| 6,240,165 B1 | * | 5/2001 | Yano et al. ............... 379/88.21 |
| 6,243,747 B1 | | 6/2001 | Lewis et al. |
| 6,363,423 B1 | * | 3/2002 | Chiles et al. ................ 709/224 |
| 6,363,499 B1 | | 3/2002 | Delo et al. |
| 6,430,541 B1 | | 8/2002 | Brown et al. |
| 6,438,749 B1 | | 8/2002 | Chamberlain |
| 6,523,070 B1 | | 2/2003 | Stapleton et al. |
| 6,546,425 B1 | | 4/2003 | Hanson et al. |
| 6,587,827 B1 | | 7/2003 | Hennig et al. |
| 6,647,510 B1 | | 11/2003 | Ganesh et al. |
| 6,654,726 B1 | | 11/2003 | Hanzek |
| 6,707,820 B1 | | 3/2004 | Arndt et al. |
| 6,714,972 B1 | | 3/2004 | Lee et al. |
| 6,725,033 B2 | * | 4/2004 | Holmes ...................... 455/419 |
| 6,769,074 B2 | | 7/2004 | Vaitzblit |

(Continued)

FOREIGN PATENT DOCUMENTS

WO    WO 1999/041937 A1    8/1999

(Continued)

OTHER PUBLICATIONS

Cisco Systems, Inc., "Programmable Network Solutions, Business and Operational Challenges," White Paper, 1992-2002, pp. 1-7.

(Continued)

*Primary Examiner*—Jude Jean-Gilles
(74) *Attorney, Agent, or Firm*—Hickman Palermo Truong & Becker LLP (57) ABSTRACT

A method is disclosed for synchronizing a device identifier value with management point systems of a service provider. In one aspect, the method involves receiving a first device identifier that is assigned to the device by a manufacturer of the device as the unique identifier of the device, receiving a second device identifier from a service provider associated with the device, assigning the second device identifier as the unique identifier of the device, and communicating a message to one or more systems indicating that the second device identifier is the unique identifier of the device.

40 Claims, 4 Drawing Sheets

U.S. PATENT DOCUMENTS

| | | |
|---|---|---|
| 6,826,611 B1 | 11/2004 | Arndt |
| 6,882,626 B1 | 4/2005 | Marathe et al. |
| 6,907,602 B2 | 6/2005 | Tsai et al. |
| 6,981,047 B2 | 12/2005 | Hanson et al. |
| 7,017,155 B2 | 3/2006 | Peev et al. |
| 7,136,645 B2 | 11/2006 | Hanson et al. |
| 7,142,530 B1 | 11/2006 | Chewning et al. |
| 7,155,497 B2 | 12/2006 | Grover et al. |
| 7,185,113 B1 | 2/2007 | Haberman et al. |
| 7,221,675 B2 | 5/2007 | Bryden et al. |
| 7,230,949 B2 | 6/2007 | Bharali et al. |
| 7,243,160 B2 | 7/2007 | Brahmaroutu |
| 2001/0056386 A1 | 12/2001 | O'Halloran et al. |
| 2002/0001307 A1 | 1/2002 | Nguyen et al. |
| 2002/0133573 A1 | 9/2002 | Matsuda et al. |
| 2003/0009752 A1 | 1/2003 | Gupta |
| 2003/0061315 A1 | 3/2003 | Jin |
| 2003/0061320 A1 | 3/2003 | Grover et al. |
| 2003/0069960 A1 | 4/2003 | Symons et al. |
| 2003/0078999 A1 | 4/2003 | Lund et al. |
| 2003/0108039 A1 | 6/2003 | Shell et al. |
| 2003/0121033 A1 | 6/2003 | Peev et al. |
| 2005/0193103 A1 | 9/2005 | Drabik |

FOREIGN PATENT DOCUMENTS

| | | |
|---|---|---|
| WO | WO 2006/010952 A2 | 2/2006 |

OTHER PUBLICATIONS

Cisco Systems, Inc., "Sigma and Cisco Systems Service Fulfillment Offering for Advanced IP Services," 1992-2001, pp. 1-6.

Cisco Systems, Inc., "Simple Network-Enable Auto-Provisioning for Cisco IAD2420 Series IADs," undated, pp. 1-26.

Nortel Networks, "Passport 6400 Express Manager," Product Brief, 2000, pp. 1-4.

Netility Corporation, "Products and Technology Overview," http://www.netility.com/pasover.html, printed Sep. 2, 2003, pp. 1-2.

Netility Corporation, "3400 Business Gateway Product Overview," http://www.netility.com/3400_overview.html, printed Sep. 2, 2003, pp. 1-4.

Netility Corporation, "Netility Announces First Auto-Configuring G.SHDSL CPE," Dec. 11, 2001, http://www.netility.com/3400_pr.html, printed Sep. 2, 2003, pp. 1-2.

Netility Corporation, "Frequently Asked Questions," http://www.netility.com/faq.html, printed Sep. 2, 2003, pp. 1-3.

Netility Corporation, "Products/Solutions Overview," http://www.netility.com/3100_overview.html, printed Sep. 2, 2003, pp. 1-2.

Netility Corporation, "3100 Product Overview," undated, 3 pages.

Netility Corporation, "Network Access Device User's Guide, Model 3100," Jun. 5, 2001, pp. 1-64.

Netility Corporation, "Netility Redefines SDSL Deployment with First Auto-Configuring CPE," Oct. 1, 2001, http://www.netility.com/3100_pr.html, printed Sep. 2, 2003, pp. 1-2.

Netility Corporation, "Netility Technology Overview," http://www.netility.com/technology_overview.html, printed Sep. 2, 2003, 1 page, copy not provided.

Netility Corporation, "Netility Configuration System," http://www.netility.com/nc.html, printed Sep. 2, 2003, 1 page.

Netility Corporation, "Netility Makes Patent-Pending Auto-Configuration and Auto-Update Technology Available for Licensing," http://www.netility.com/technology-licensing_pr.html, printed Sep. 2, 2003, pp. 1-2.

"Frame Relay Fast Packet Switching," Frame Relay Tutorial, Sangoma Technologies, Inc., http://www.sangoma.com, Nov. 8, 1999, pp. 1-3.

T. Bradley, et al., "Inverse Address Resolution Protocol," The Internet Society, Sep. 1998, pp. 1-10.

U.S. Appl. No. 10/422,227, Arnold Stamler, et al., "Method and Apparatus Providing Automatic Connection Announcement From A Modular Network Device To A Network Management Point," filed Apr. 23, 2003, Not Published, copy not provided.

U.S. Appl. No. 10/422,231, Arnold Stamler, "Method and Apparatus For Automatically Synchronizing A Unique Identifier Of A Network Device," filed Apr. 23, 2003, Not Published, copy not provided.

U.S. Appl. No. 10/434,586, Arnold Stamler, et al., "Method and Apparatus Providing Automatic Provisioning Of Modular Network Devices," filed May 8, 2003, Not Published, copy not provided.

OpenRoute Networks, Inc.; "Using the ARP and Inverse ARP Protocols;" Copyright 1998, OpenRoute Networks, Inc.; 8 pages.

Comer, Douglas, E., "Computer Networks and Internets;" Copyright 1997, Prentice Hall, Inc.; 3 pages.

The Gale Group, "Summagraphics Introduces New Tablet Driver", News Release, p 1, Mar. 19, 1990, Summagraphics Corporation.

Cisco Systems, Inc., "Cisco DSL Manager, Maintaining System Performance," 1992-2003, http://www.cisco.com/en/US/products/sw/netmgtsw/ps826/products_user_guide_chapter09186aoO, data retrieved Oct. 22, 2003,pp. 1-8.

* cited by examiner

METHOD AND APPARATUS FOR AUTOMATICALLY SYNCHRONIZING A UNIQUE IDENTIFIER OF A NETWORK DEVICE

CROSS REFERENCE TO RELATED APPLICATIONS

This application is related to U.S. application Ser. No. 10/422,227, filed on Apr. 23, 2003, entitled "Method and Apparatus Providing Automatic Provisioning of Modular Network Devices", by Arnold Stamler and Ikramullah Mohammad, the entire disclosure of which is hereby incorporated by reference for all purposes as if fully set forth herein.

FIELD OF THE INVENTION

The present invention generally relates to managing network devices. The invention relates more specifically to synchronizing a unique identifier of a network device.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

For various contexts and devices, unique identifiers have been assigned to devices for interested parties to track the devices. In the context of computers and networks, unique network addresses are assigned to each computer on the network. Further, components within the computers may be assigned unique identifiers. If management systems are used to manage computers or other network devices, use of such identifiers requires synchronizing the identifiers to the management systems. When it becomes necessary or desirable to change the value of the unique identifier for a particular device, past approaches have been inadequate.

One past approach has been to manually enter the new value into the system associated with the device. For example, changing the identifier for a router in a packet-switched network requires service people to manually update associated management systems. However, this approach is costly because it requires manual intervention.

In the context of management of complex networks of telecommunications service providers, the service provider management domain can consist of multiple management points each with a specific function within the overall business workflow. For example, the management points may include a billing system, provisioning system, fault detection system, etc. Within the management domain, there is a need to associate with each managed device, a unique identifier (ID) referenced by the providers' device management point(s).

When delivering messages from a management point to a device, a transport protocol typically expects the device to be addressed by the device's unique ID. Further, each management point typically expects each message received from a device to include the device's ID, which is then referenced by a management point as a key into its database of logical device objects. Service providers assume that the management points and the device are synchronized with respect to the value of the device's unique ID.

However, it is possible for the device to be reconfigured using command-line interface ("CLI") commands such that the unique ID of the device will change from the original value assumed by the management points. The device's reconfiguration, which causes the change in unique ID, can originate from any of the management points or a component of a management point or be configured manually directly by a human accessing the device via a console. When the change does not issue from a management point, there may be no way for the management point to know that a change occurred, unless the management point is manually updated with the new value. Manual updating is undesirable for many reasons.

Thus, when such a configuration change occurs, synchronization is lost, and the management points and the device are no longer be able to communicate. Accordingly, there is a need for an automated way to synchronize the management points to a changed unique identifier or a network device.

For example, the unique ID of a device may be modified as part of bootstrapping a customer premises equipment ("CPE") device within the context of automated flow-through provisioning. Alternatively, when two service providers merge, the unique ID of devices may require changes to accommodate a merging of the unique ID name space associated with the CPE devices.

Based on the foregoing, there is a clear need for a way to synchronize a change in the value of a particular device's unique identifier with one or more management points or systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for synchronizing a unique identifier of a device is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Synchronizing a Unique Identifier of a Device
   3.1 An Operational Example of Drop Shipment
   3.2 An Operational Example of Depot Shipment
4.0 Implementation Mechanisms-Hardware Overview
5.0 Extensions and Alternatives

1.0 GENERAL OVERVIEW

The needs identified in the foregoing Background, and other needs and objects that will become apparent for the following description, are achieved in the present invention, which comprises, in one aspect, a method for synchronizing a unique identifier of a device. A first device identifier is received; the first device identifier is assigned to the device by a manufacturer of the device as the unique identifier of the device. A second device identifier is received from a service provider associated with the device. The second device identifier is assigned as the unique identifier of the device. A message is communicated to one or more systems indicating that the second device identifier is the unique identifier of the device.

According to one approach, a method involves providing a unique network device identifier that can be modified on command, providing feedback of ID changes back to an event bus or other middleware in an agreed-upon format, such as XML, and usage of the command and the feedback message within the bootstrap process.

For example, in one specific approach, as part of a device manufacturing process, a default configuration is written into the non-volatile memory of a device. The only value of unique ID that can be configured into the device is a hardware-based ID, such as chassis serial number, MAC address, etc., since these are the only values defined within the domain of the manufacturer or vendor for a given device. As a particular example, with devices from Cisco Systems, Inc., the default configuration includes the device configuration command 'cns id hardware' which directs the device to use its hardware serial number as its unique ID. In another approach, a command of the form 'cns id string [!SN!]' is used. At manufacturing time, an automated manufacturing script performs a text substitution of the [!SN!] with the chassis serial number, so that the final command configured on the device is 'cns id string J1X12234522' where J1X12234522 is sample chassis serial number for this example. Further description of a particular example command implementation, for devices from Cisco Systems, Inc. that use Cisco IOS CLI, is provided in the Appendix.

Next, a service provider discovers and receives the hardware ID value of each device through a back-end communication mechanism with the vendor of the device. The back-end communications can be electronic, such as through a purchasing or order-entry system, or manual methods can be used. Once the hardware ID for a given device is discovered and received by the service provider's systems, such systems expect to communicate and reference that device by its hardware ID.

However, referencing a device by its hardware ID is unacceptable as a long-term approach because service providers desire to use their own device nomenclature and name space for unique device identifiers. Further, each service may comprise a plurality of independent systems that all need to be synchronized to a single identifier for a given device. Therefore, upon physical deployment of a device to the customer premises and power-up, the device contacts the service provider provisioning system based on its default configuration and then uniquely identifies itself by hardware ID. The provisioning system recognizes the device hardware ID. In response, the provisioning system provides the device with its application business configuration. As one specific example, for Cisco devices, included in the business configuration is the command 'cns id string ABCD' which directs the device to identify itself as ABCD instead of the default hardware ID.

In response, the device communicates a message, using any available or suitable application layer broadcast medium, which updates the identifier used by the device. In certain embodiments, an event bus is used as the broadcast medium; thus, in response, the device generates an event on the event bus. The event specifies a source identifier set to the hardware ID, but its payload indicates a switchover to the new ID value. This event is the final event that is issued using the hardware ID as the source identifier. Other service provider systems, for example, a billing system, fault management system, etc., receive the new event and resynchronize themselves to the new unique ID value, which is the service provider native value. This resynchronization supports automated provisioning approaches and other processing because it allows the service provider systems to be relatively loosely coupled.

The foregoing steps are achieved in an automated fashion without human intervention.

In other aspects, the invention encompasses a computer apparatus and a computer-readable medium configured to carry out the foregoing steps.

2.0 STRUCTURAL AND FUNCTIONAL OVERVIEW

In one approach, a network device and a management point reside on a common event transport bus. Functionality is imbedded into a network device, such that when its unique ID is modified, the device publishes an event onto the event bus whose subject indicates, for example:

ID-changed.[value of old id]

and whose XML payload indicates:

<old-id>old value</old-id>, <new-id>new value</new-id>.

The subject of the event alerts all management point listeners that the device's ID has changed. Inclusion of the value of the old ID as part of the event subject enables the management point listeners to 'see' the event given that their listening may be filtered on only certain device IDs. Upon parsing the XML payload the management point can then resynchronize to the new value of unique id which may involve such internal housekeeping such as changing the key attributes in the corresponding logical device object as well as re-listening on the event bus, filtered on the new ID value.

Thus, approaches described herein enable dynamic changing of device ID as part of the provisioning of the device such that the rest of the system can be automatically resynchronized without any human intervention. For example, a device might be shipped from the factory with a bootstrap value for its unique ID. As part of initial turn-up provisioning, a command-line interface command is dispatched to the device to change its unique ID to a value that is consistent with the application name space of the management point.

As another example, the ID of a device ID is dynamically calculated based on where on the edge the device is connected. In this dynamic case, the value could change from day to day. With the approaches herein, these types of ID changes could occur and the rest of the management points in the system are automatically resynchronized with no human intervention.

Approaches herein effectively provide feedback about changes in device Ids, in that the management point can provision a device to change its unique ID, and then the device can feed back the changes to the same management point that then updates itself based on the feedback.

Thus, one context in which a device's unique identifier may be synchronized is the context of manufacturing, ordering, and selling of devices. For example, a vendor manufactures devices that a service provider orders to fulfill service orders for its subscribers. A service provider may order devices from the vendor on behalf of the subscriber and coordinate delivery of the devices to the subscriber. In one case, the vendor may deliver devices directly to the subscriber after the service provider has ordered the devices on behalf of the subscriber (referred to hereinafter as "drop shipment"). In another case, the service provider may bulk order devices in anticipation of subscribers ordering the devices. In this case, the devices are delivered to the service provider and remain there until the subscriber orders the devices (referred to hereinafter as "depot shipment").

The movement of the devices and information pertaining to the manufacturing, ordering, and selling of devices between the vendor, service provider, and subscriber is referred to herein as the "workflow" of the device. The vendor, service provider, and subscriber need to communicate about the status of the devices as the devices move along the workflow. Devices may be any element of network infrastructure, including routers, hubs, gateways, switches, modems, terminal adapters, etc.

Assignment of unique identifiers to devices facilitates communication between interested parties, which include but are not limited to vendors, service providers, and subscribers, as the devices move along the workflow. However, when subscribers order service from a service provider that requires the deployment of a network device, the service provider uses a unique administrative identifier created by the service provider to track information pertaining to the to-be deployed device, which the vendor may not have manufactured yet. According to one embodiment, the vendor assigns, during the manufacturing process, a unique identifier for a particular device using a value of a hardware identifier, such as a chassis serial number or a MAC address. However, the interested parties may want to change the value of the unique identifier to a value of their choosing any number of times.

Figure 1:
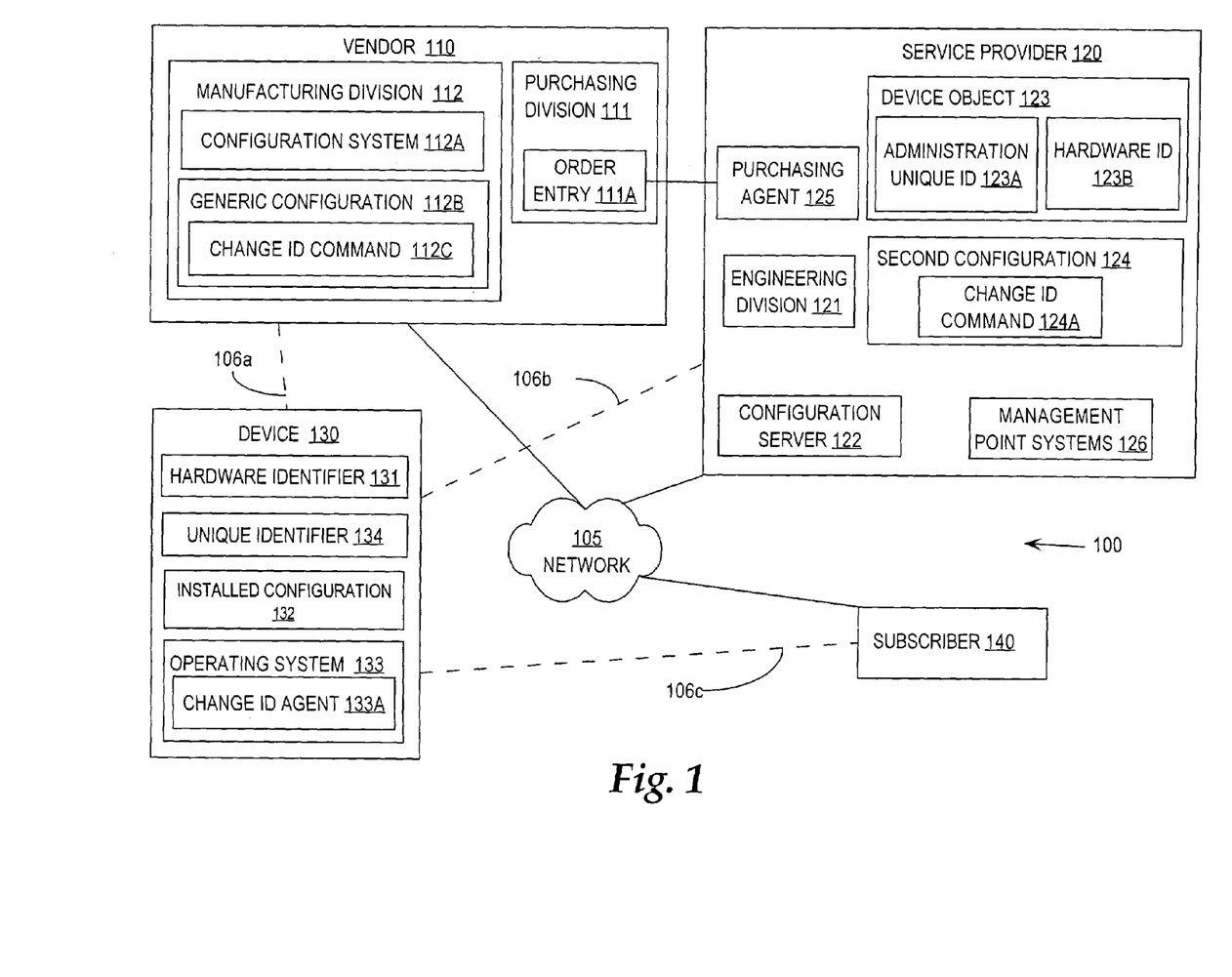
FIG. 1 is a block diagram depicting a system for synchronizing the unique identifier of a device.

FIG. 1 is a block diagram depicting a system for synchronizing the unique identifier of a device, according to one embodiment. The system 100 comprises a Vendor 110 of a Device 130, a Service Provider 120 of the Device 130, and a Subscriber 140 to the Device 130. Subscriber 140 subscribes to services that depend on deployment of the Device 130. Although vendors, service providers, and subscribers may order many devices, for the purposes of illustrating a clear example, System 100 depicts one such device (130). Vendor 110, Service Provider 120, and Subscriber 140 may communicate with one another electronically or through manual means. As one example, Vendor 110 is communicatively coupled to Service Provider 120 and to Subscriber 140 through a network 105, which may comprise one or more local area networks, wide area networks, internetworks, etc. In other approaches, the subscriber does not communicate with the vendor, but only communicates with the Service Provider. At various times or points in the processes described herein, Device 130 is located within domains of Vendor 110, Service Provider 120, or Subscriber 140, as indicated by dashed lines 106a, 106b, 106c.

Device 130 comprises a Hardware Identifier 131 that is assigned to Device 130 by a Manufacturing Division 112 associated with Vendor 110. The Manufacturing Division 112 may assign any sequence of characters as the Hardware Identifier 131. For example, these characters may include, but are not limited to, alphanumeric and special characters such as "@", "#", "$", "%", "*".

According to one embodiment, a serial number associated with some component of Device 130, such as its chassis or CPU, is used as the Hardware Identifier 131. The Device 130 may acquire its Hardware Identifier 131 using any of several mechanisms. For example, a Change ID 133A Agent of Operating System 133 may execute a command, such as Change ID Command 112C, which causes Device 130 to "self-discover" an identifier value associated with a component of the Device 130. Examples of identifier values that Device 130 may "self-discover" and assign to Hardware Identifier 131, include, but are not limited to, the chassis serial number or the MAC address. According to another embodiment, the Hardware Identifier 131 may be manually inputted into Device 130 as part of manufacturing or an initial configuration process. For example, a command of the form 'cns id string [!SN!]', which is the text of the default command-line interface (CLI) command, may be used. At manufacturing time, an automated manufacturing script performs a text substitution of the [!SN!] with the chassis serial number, so that the final CLI command seen by the device is 'cns id string J1X12234522' where J1X12234522 is sample chassis serial number for this example.

Device 130 further comprises a Unique Identifier 134 that uniquely identifies Device 130. For example, the value "xyz" may be assigned as the Unique Identifier 134 for Device 130 whereas the value "abc" may be assigned as the unique identifier for a different device. In contrast to Hardware Identifier 131, Unique Identifier 134 is changeable when Device 130 is in operation. In one specific embodiment, Unique Identifier 134 is changeable using Change ID Agent 133A, which responds to configuration commands that specify changing the Unique Identifier 134. Such commands may instruct Device 130 to adopt its Hardware Identifier 131 as its Unique Identifier 134, or to adopt some other value as its Unique Identifier.

At the time of manufacturing, Device 130 is configured with an Installed Configuration 132. The Installed Configuration 132 may include commands for changing the value of the Unique Identifier 134. Device 130 includes an Operating System 133, among other things, for executing commands associated with the Installed Configuration 132. According to one embodiment, Operating System 133 includes a Change ID Agent 133A for executing instructions for synchronizing a unique identifier of a device. Among other things, these instructions may be used to execute commands of a particular type, such as Change ID Command 112C and Change ID Command 124A, which are described further below.

Vendor 110 may comprise a Purchasing Division 111 to handle orders from Service Provider 120 for Device 130 and a Manufacturing Division 112 for manufacturing the Device 130. According to one embodiment, Purchasing Division 111 comprises an Order Entry application 111A for communicating purchasing information from Vendor 110 to Service Provider 120. According to one embodiment, the Order Entry application 111A is used to communicate the Hardware Identifier 131 for Device 130 to Service Provider 120. For example, Order Entry application 111A may communicate the Hardware Identifier 131 for Device 130 to Service Provider 120 in response to a request from the Service Provider for current status about an order for the device. In one approach, the Order Entry application 111A may perform the functions of order entry from the Purchasing Agent as well as communicating Hardware ID 131 for Device 130 back to Service Provider 120. In another approach, an Order Status application within Purchasing Division 111 communicates hardware Identifier 131 to the Service Provider.

Configuration System 112A is a mechanism, provided by the Manufacturing Division 112, for the Service Provider 120 to communicate the configuration that the Service Provider 120 wants the Vendor 110 to use as the Installed Configuration 132 for a particular order or Device 130. According to one embodiment, Configuration System 112A is Configuration Express as provided by Cisco Systems, Inc., San Jose, Calif. Service Provider 120 communicates a Generic Configuration 112B to the Vendor 110 through Configuration System 112A. According to one embodiment, the Generic Configuration 112B is a bootstrap configuration that is loaded as the Installed Configuration 132 of Device 130 when manufacturing of Device 130 is complete.

According to one embodiment, a Change ID Command 112C is associated with the Generic Configuration 112B. The Change ID Command 112C specifies the value that is to be assigned to the Unique Identifier 134 of Device 130 when Generic Configuration 112B becomes the Installed Configuration 132.

In one embodiment, Service Provider 120 comprises an Engineering Division 121, a Device Object 123, a Purchasing Agent 125, a Second Configuration 124, a Configuration Server 122, and Management Point Systems 126. Engineering Division 121 defines the Generic Configuration 112B and communicates the Generic Configuration 112B to the Vendor 110 with the Configuration System 112A.

Device Object 123 is a logical representation of the Device 130 that is maintained by Service Provider 120 for purposes of tracking device orders and deployments. According to one embodiment, the Device Object 123 maps an Administrative Unique ID 123A to a Hardware Identifier 123B. The Administrative Unique ID 123A holds a value that is internally generated by Service Provider 120 to uniquely identify a device that has been ordered by Subscriber 140 before the Service Provider receives a hardware identifier or other unique identifier that is actually associated with a particular device such as Device 130. The Administrative Unique ID 123A uniquely identifies a device that a particular subscriber, such as Subscriber 140, has ordered or will order in the future. Later, an order for a device may become associated with a particular device, such as Device 130, by assigning Hardware Identifier 131 of Device 130 to the Hardware Identifier 123B of Device Object 123. For example, the Order Entry application 111A or Order Status application communicates the Hardware Identifier 131 of Device 130 to the Service Provider 120 in response to a request from the Service Provider for an update about a particular order. Service Provider 120 may then assign the value of the Hardware Identifier 131 to the Hardware Identifier 123B in the Device Object 123.

According to one embodiment, Purchasing Agent 125 places an order with the Vendor 112 for a device to be used by Subscriber 140. The Purchasing Agent 125 may receive the value associated with the Administrative Unique Identifier 123A from Device Object 123 to place and track the order. The Purchasing Agent 125 may communicate the value of the Administrative Unique Identifier 123A to the Configuration System 112A as part of placing an order with Vendor 110. In one implementation, Purchasing Agent 125 communicates Administrative Unique ID 123A to Order Entry application 111A as part of order information, such as PO number, order notes, etc., which are echoed back within the order status.

According to one embodiment, the Second Configuration 124 is a configuration that the Service Provider 120 specifically wants installed as the Installed Configuration 132 for Device 130 for Subscriber 140. For example, the Second Configuration 124 may contain commands or parameter values that are specific to an operating environment or business environment of Subscriber 140. Thus, while the Generic Configuration 112B may be sufficient for initial configuration of all devices deployed by the Service Provider 120, for a particular Subscriber 140, the Second Configuration 124 is needed.

According to one embodiment, Second Configuration 124 contains a Change ID Command 124A. The Change ID Command 124A may specify a value that is assigned to the Unique Identifier 134 of Device 130 when the Second Configuration 124 becomes the Installed Configuration 132, thus changing the value of the Unique Identifier 134 of Device 130. The Change ID Command 124A may be used to assign any sequence of characters as the Unique Identifier 134. For example, a string value within a name space associated with Management Point Systems 126 is the value that the Change ID Command 124A assigns as the Unique Identifier 134 of Device 130. In one approach, the string value is equal to the Administrative Unique ID 123A. According to one embodiment, the value the Change ID Command 124A assigns as the Unique Identifier 134 is created by the Subscriber 140 and communicated to the Service Provider 120. Alternatively, the value the Change ID Command 124A assigns as the Unique Identifier 134 is created by the Service Provider 120.

According to one embodiment, the Configuration Server 122 creates and transmits the Second Configuration 124 to the Subscriber 140. According to one embodiment, Configuration Server 122 creates the Second Configuration 124 when Device 130 connects to the Configuration Server and requests a configuration. According to one embodiment, the Configuration Server 112 is encompassed within the Cisco CNS 2100 Series Intelligence Engine, from Cisco Systems, Inc.

According to one embodiment, Management Point Systems 126 are systems that are interested in the value assigned to the Unique Identifier 134. Examples of Management Point Systems 126 include, but are not limited to, billing systems, provisioning systems, and fault detection systems. As depicted, Management Point Systems 126 are part of Service Provider 120, however, Management Point Systems 126 may be any systems that are informed when a new value is assigned to the Unique Identifier 134.

Figure 2:
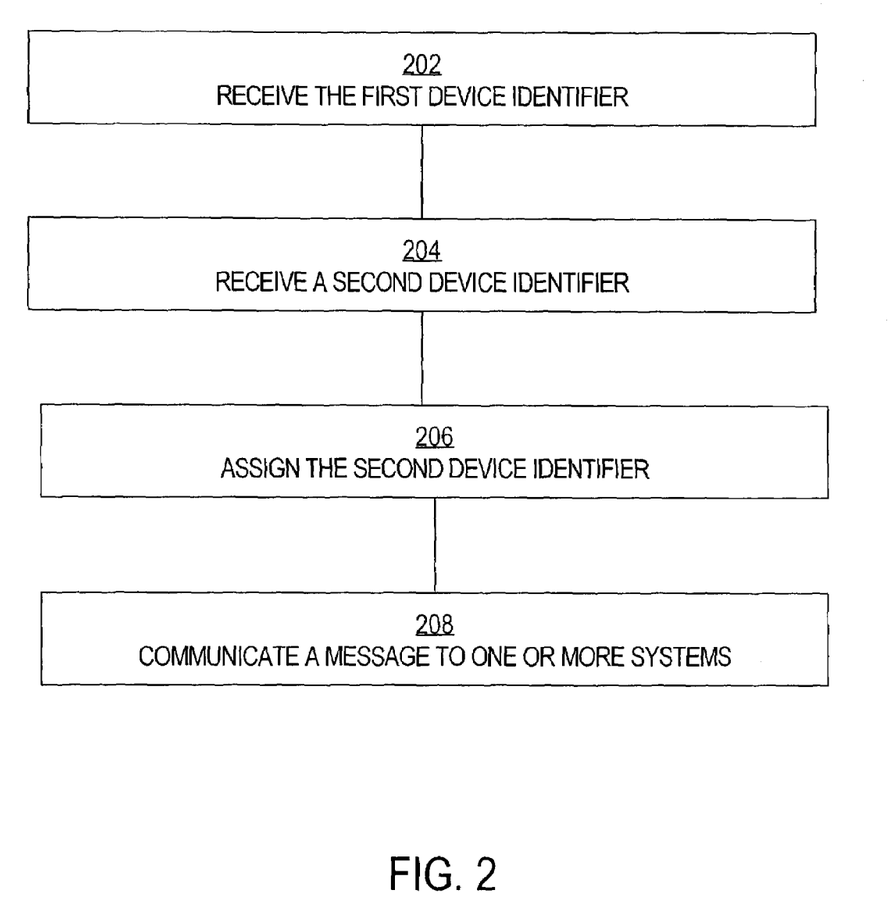
FIG. 2 is a flowchart depicting steps performed by a device to synchronize its unique identifier.

FIG. 2 is a flowchart depicting steps performed by a device to synchronize its unique identifier, according to one embodiment.

At step 202, the device receives a first device identifier that is assigned to the device by a manufacturer. For example, the device is instructed to use its chassis serial number or MAC address as a unique identifier. At step 204, the device receives a second device identifier from a service provider, and at step 206, the device assigns the second device identifier as the unique identifier of the device. For example, a configuration loaded in the device includes a Change ID command that instructs the device to use a specified string value as its unique identifier.

At step 208, the device communicates a message to one or more systems indicating that the second device identifier is the unique identifier of the device. For example, the device publishes an event or other message that specifies both the original device identifier, such as chassis ID or MAC address, and the new identifier. In response to receiving such an event, a receiving system can update appropriate records to use the new unique identifier.

The techniques described herein may be usefully applied to changing device identifiers as part of providing a bootstrap configuration to a router. In general, when routers exit the manufacturing process, they can be made capable, upon boot up, of initiating contact to a management point and identifying themselves using a chassis serial number, MAC address, or other hardware identifier. Typically, these are the only unique ID values that are defined within the domain of the manufacturing process, and which can be embedded into the router.

However, service providers typically have their own name space and nomenclature for assigning a unique ID, which is different from the Hardware ID values. There needs to be a way for the service providers to leverage the Hardware ID of the device during the deployment bootstrap process and then switchover to its own native format and value of unique ID which would be used subsequent to bootstrap for the rest of the deployment lifecycle for the CPE.

When these CPEs are first turned up at the subscriber premises, the service provider systems must be capable identifying the CPE based on the hardware ID. For example, when the device boots up, it can publish a declarative event such as 'device-booted'. Upon successful provisioning or configuration, the device publishes a 'success' event, which can be consumed by a billing system at the service provider, or a 'fail' event that can be consumed by a fault system. The device provides its hardware ID in all such event messages, and the service provider systems that consume the events need to be synchronized to identify the device using the same Hardware ID. There are a number of methods the service provider systems can use to become synchronized to the device's Hardware ID.

Thereafter, as part of the normal provisioning process, the service provider deploys an application configuration to the CPE, overwriting the bootstrap configuration with the business application configuration. The business configuration contains specialized commands that reconfigure the value of the unique ID to a value from the service provider's own name space and nomenclature. The device publishes an 'id-change' event, referencing the old Hardware ID as its device identifier, but with a payload that declares the new unique ID value from the service provider name space.

Service provider systems need this event to be published referencing the old Hardware ID because such systems originally subscribed to the event based on the initial bootstrap process. Upon processing the new ID value in the event, the systems resynchronize themselves to use the service provider name space ID for all subsequent references to or from the CPE. The 'id-change' event provides a way for the service provider to both deploy a change in automated fashion, and make use of a unique ID from its own name space over the deployment lifecycle of the device.

The foregoing general techniques are now described in further detail.

Figure 3:
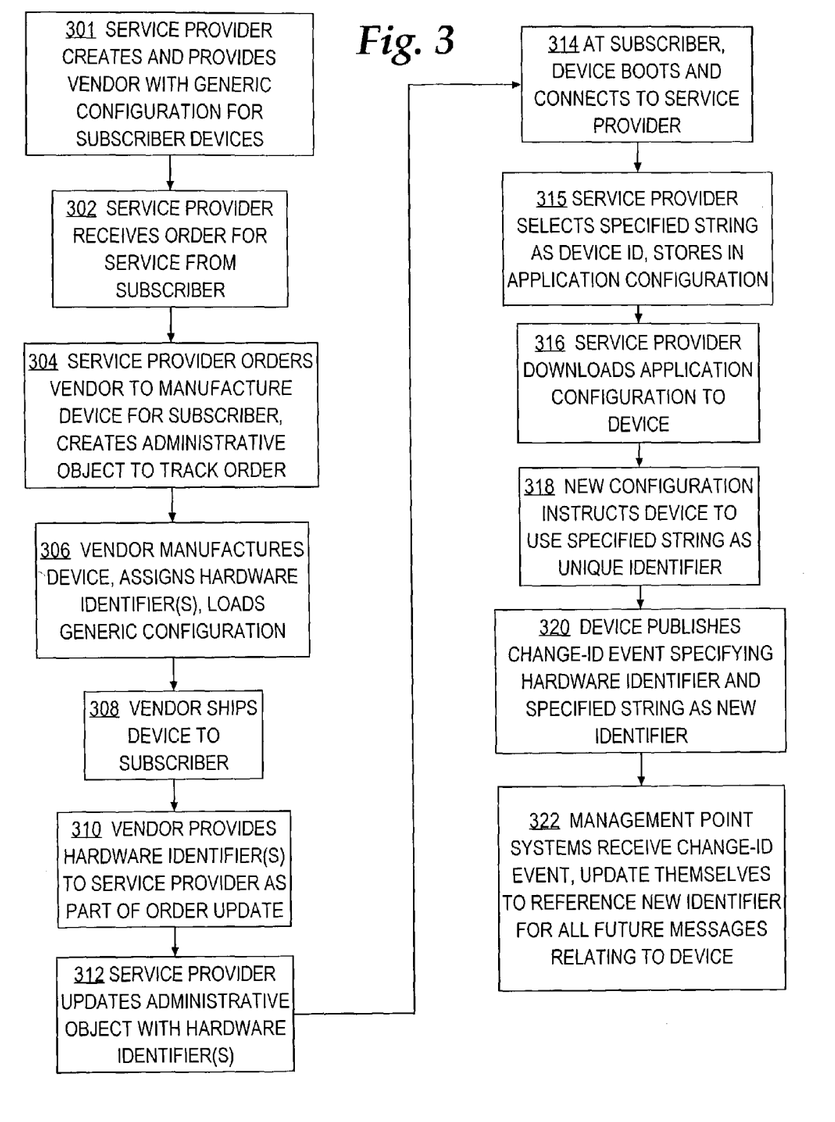
FIG. 3 is a flow diagram illustrating a process of synchronizing a unique identifier in the context of drop shipping a network device.

3.0 METHOD OF SYNCHRONIZING A UNIQUE IDENTIFIER OF A DEVICE 3.1 An Operational Example of Drop Shipment FIG. 3 is a flowchart depicting steps performed by a device to synchronize its unique identifier, according to one embodiment.

In this section, the steps of FIG. 3 are described in the context of the Vendor 110 drop shipping Device 130 to Subscriber 140. In drop shipment, Vendor 110 delivers Device 130 directly to the Subscriber 140 after the Service Provider 120 orders the Device on behalf of the Subscriber.

For the purposes of illustrating a simple example, assume that Device 130 is a CPE router such as a residential broadband access router, the Administrative Unique Identifier 123A is "sub 123", the Hardware Identifier 131 is a chassis serial number "xyz," the Change ID Command 112C is "CNS ID HW ID", the Change ID Command 124A is "CNS ID STRING 'string'" "CNS ID STRING 'sub 123'", the Generic Configuration 112B is a bootstrap configuration, the message is an event that conforms to an XML format, and the Management Point Systems 126 have subscribed to the event. In other embodiments, other forms of Change ID commands may be used.

At step 301, a service provider creates and provides a vendor with a generic configuration for use with subscriber devices. For example, Service Provider 120 creates Generic Configuration 112B and provides the generic configuration to the Vendor 110. The Generic Configuration 112B is intended for loading at manufacturing time in all devices that are ordered later by Service Provider 120 for its Subscribers 140. Generic Configuration 112B that contains basic configuration commands sufficient for booting Device 130 up when the Device arrives at Subscriber 140 and for establishing connectivity to Configuration Server 122. Further, the generic configuration applied by the vendor contains commands that instruct the device to use its hardware identifier as its unique identifier. The Service Provider 120 communicates the Generic Configuration 112B to the Vendor 110 through Configuration System 112A, in preparation for ordering devices from Vendor 110.

In step 302, the service provider receives an order for service from a subscriber. For example, Subscriber 140 places an order for broadband Internet access with Service Provider 120. To fulfill such an order for service, the Service Provider 120 needs to provide Subscriber 140 with a broadband access router for use at the premises of Subscriber 140.

In step 304, the service provider orders the vendor to manufacture a device for the subscriber, and creates an administrative object to track the order. For example, a Purchasing Agent 125 of Service Provider 120 contacts Order Entry application 111A of Vendor 110 and enters an order for Device 130. Service Provider also creates, in its own order management systems, a Device Object 123 that tracks information about the order. Because Service Provider 120 initially has no specific identifying information for Device 130 from Vendor 110, the Service Provider temporarily creates Administrative Unique ID 123A in Device Object 123 to logically represent Device 130. For example, assume that Service Provider 120 stores a value, "sub 123", in Administrative Unique Identifier 123A. The value "sub 123" represents a particular device, e.g., Device 130, ordered for a particular subscriber, e.g., Subscriber 140.

Further, the Service Provider 120 may communicate the value "sub 123" of the Administrative Unique Identifier 123A to the Vendor 110 through the Purchasing Agent 125. For example, the value "sub 123" may be entered into a field, such as a purchase order field, of the Order Entry application 111A by Purchasing Agent 125.

At step 306, Vendor 110 manufactures a device, assigns one or more unique hardware identifiers to the device, and loads the device with a generic configuration. For example, Device 130 may receive the Hardware Identifier 131, "xyz," which is a chassis serial number that the Manufacturing Division 112 assigned to the chassis of the Device. Device 130 may also receive a MAC address as part of the manufacturing process. Generic Configuration 112B is loaded into Device 130 and becomes its Installed Configuration 132.

As part of step 306, the hardware identifier is assigned as a unique identifier for the device. For example, the Generic Configuration 112B may include a Change ID Command 112B, which when executed by Device 130, causes the Device to retrieve the Hardware Identifier 131 and use the Hardware Identifier as the Unique Identifier 134 of the Device.

At step 308, the vendor ships the device to the subscriber; for example, Vendor 110 ships Device 130 directly to Subscriber 140. At step 310, the vendor provides the hardware identifiers of the device to the service provider as part of an order update. At step 312, the service provider updates the administrative object with the hardware identifier(s).

Step 310 and step 312 may be performed either before or after step 308. For example, the Manufacturing Division 112 may not have finished manufacturing Device 130 or shipped the device as part of step 310. However, at step 306 the Vendor 110 has determined a chassis serial number, xyz, which will be used as the Hardware Identifier 131 for Device 130 once it has been built. The value xyz shall be referred to herein as the "potential hardware identifier." In response to Service Provider 120 ordering Device 130, Vendor 110 may communicate the potential hardware identifier, xyz, as well as echoing back the Administrative Unique Identifier 123A, "sub 123", to the Service Provider 120, as part of an order update message. In response, Service Provider 120 uses the Administrative Unique Identifier 123A, "sub 123" (which it provided on the original order entry 304), to locate Device Object 123 and stores the potential hardware identifier, xyz, in the Hardware Identifier 123B, thus, creating a mapping between Administrative Unique Identifier 123A and the potential hardware identifier.

At step 314, the device boots and connects to the service provider. For example, at the premises of Subscriber 140, Device 130 is booted up. When the Device 130 is booted up, the Installed Configuration 132, e.g., Generic Configuration 112B, including the Change ID Command 112C is executed. In this example, the Change ID Command 112C conforms to the CLI syntax of Cisco Systems, Inc. and has the format "cns id hardware-serial". The command causes the device to retrieve the Hardware Identifier 131, which in this case is the chassis serial number xyz, and assign it as the Unique Identifier 131 of the Device 130. At this point, the value xyz is stored in the Unique Identifier 131.

Further, when Device 130 is booted up, it may connect with a Configuration Server 122 and transmit the Unique Identifier 131, xyz, to the Configuration Server 122. The transmitted value, xyz, is used to locate the Device Object 123 by comparing the transmitted value to the Hardware Identifier 123B.

At step 315, the service provider selects a specified string for use as a device identifier and stores the specified string in an application configuration for the device. For example, Service Provider 120 selects a device identifier value that is meaningful in terms of a name space managed by the Service Provider, or meaningful to Management Point Systems 126. The value could be "sub 123".

According to one embodiment, the value, "sub 123", of the Administrative Unique Identifier 123A is used as the new value for the Unique Identifier 134 of Device 130. For example, the value, "sub 123", of the Administrative Unique Identifier 123A is retrieved from Device Object 123 and used to create a Second Configuration 124.

At step 316, the service provider downloads the application configuration to the device. For example, Configuration Server 122 of Service Provider 120 downloads Second Configuration 124 to Device 130. In general, the configuration server is responsible for low-level transport of configuration to the device; other transport mechanisms may be used in other implementations.

At step 318, the new configuration instructs the device to use the specified string as the unique identifier of the device. For example, the Second Configuration 124 may include a command "CNS ID STRING 'string'". When loaded, the Second Configuration 124 becomes the Installed Configuration 132 of Device 130, and the 'string' sub string is replaced with the value "sub 123". The command "CNS ID STRING 'string'" causes Device 130 to assign "sub 123" as the Unique Identifier 134 of Device 130.

At step 320, the device publishes a change-identifier event specifying both its hardware identifier(s) and the specified string as the new identifier. For example, the device communicates a message to one or more systems indicating that the second device identifier is the unique identifier of the device. In one embodiment, the message is an event that conforms to an XML format. In general, the event comprises a subject and a payload. The subject is expressed using a hierarchical name space, for example, text.text.text. . . . Thus, as an example, the subject of the event may be "Cisco.cns.id-changed.xyz" and the payload may have a tag for the old identifier, the value of the old identifier, xyz, a tag for the new identifier, and a value for the new identifier, "sub 123". The Management Point Systems 126 may subscribe to this event with "Cisco.*.id.changed". Other event formats and parameter values may be used to accomplish the same functions and results.

Device 130 publishes the event to the Management Point Systems 126 for the purpose of informing the Management Point Systems that the unique identifier value for the device has changed from xyz to "sub 123". According to one embodiment, the event is transmitted over an application level broadcast medium. In certain specific embodiments, the broadcast medium is an event bus such as those available from TIBCO; in other embodiments, the broadcast medium is an implementation of an object broker such as CORBA, or other suitable middleware.

In step 322, the management point systems receive the change identifier event and update themselves to reference the new device identifier for all future messages relating to the device. As a result, the management point systems become synchronized to the changed device identifier. Thus, the Device 130, Device Object 123, and Management Point Systems 126 all reference the same device identifier, which has been selected and specified from a name space managed by the Service Provider 120.

If the value of the Unique Identifier 134 needs to be changed again, a third configuration specifying the value may be loaded onto Device 130 and processing is performed similar to that described above for loading Second Configuration 124. For example, a third configuration specifying that the Unique Identifier 134 should be set to "abc" may be loaded into Device 130 and executed. As a result, an event will be transmitted to Management Point Systems 126 indicating the Unique Identifier 134 for Device 140 has been changed from "sub 123" to "abc".

As described in this section, manual manipulation of Device 130 is not required, and steps of FIG. 3 are performed automatically. According to one embodiment, step 306 may be performed in response to a human manually inputting a sequence of characters, or Device 130 may "self-discover" its Hardware Identifier 131.

For the purposes of illustrating an example, in the discussion above Change ID Command 112C is "cns id hardware-serial". Alternatively, Change ID Command 112C may be "cns id string [!SN!]" The sub string "[!SN!]" may be parsed during manufacturing and substituted with a serial number from any component of Device 130, such as the chassis serial number. Analogously, the sub string "[!MAC!]" can be used when MAC address is to be substituted.

3.2 An Operational Example of Depot Shipment

In this section, the steps for synchronizing Device 130's Unique Identifier 134 are described in the context of depot shipment of network devices. In depot shipment, Service Provider 120 issues bulk orders for devices in anticipation of a plurality of subscribers, including Subscriber 140, ordering the devices at a later time. Much of the description of the previous section also applies to depot shipment. The assumptions for the previous drop shipment example may also be used for the depot shipment example described herein Referring again to FIG. 3, in depot shipment certain steps occur at different times and in different sequences. Generally, steps 301 and 312 to 322, inclusive, are performed as shown in FIG. 3. However, Service Provider 120 orders Device 130 in anticipation of Subscriber 140 ordering Device 130 instead of ordering Device 130 in response to Subscriber 140 ordering Device 130. For example, the Service Provider 120 orders devices in bulk and stores them in their original vendor cartons, unopened. When a Subscriber 140 orders devices, the service provider affixes shipping labels indicating the administrative unique identifier, "sub 123". Additionally, the original vendor's carton labels indicate the Chassis serial number xyz. The ID values on all labels may also be expressed as bar codes so that a scanner can be used to read the values of the administrative unique identifier, "sub 123", and the chassis serial number, xyz.

Further, Vendor 110 may not communicate the chassis serial number, xyz, to the Service Provider 140 prior to shipping Device 130 to the Service Provider 140. Therefore, the chassis serial number is stored in the Device Object 123 at a later time. For example, Service Provider 120 may use a scanner to read the bar codes while the devices are in storage waiting to be shipped. The value of the administrative unique identifier, "sub 123", is used to locate the Device Object 123 and store the value of the chassis serial number, xyz, into the Hardware Identifier 123B of the Device Object 123. Device 130 is shipped to Subscriber 140 where the Device 130 is booted up. Steps 312 to 322, inclusive, are then performed.

According to another embodiment, the Subscriber 140 may read the values of the administrative unique identifier and the hardware identifier from the label and transmit the values to the Service Provider 120. Again, the value of the administrative unique identifier, "sub 123", is used to locate the Device Object 123 and store the value of the chassis serial number, xyz, into the Hardware Identifier 123B of the Device Object 123. Steps 312 to 322, inclusive, are then performed.

3.3 Merging of Service Providers

Embodiments may be used to synchronize device identifiers when two or more service providers merge and combine the name spaces that they use to identify network devices.

For example, in this scenario, steps 315 to 322 are re-performed for each network device that has been deployed. Step 315 additionally involves a first one of the merged service providers selecting a device unique identifier value from the name space that is maintained by the second of the merged service providers. Steps 315-322 are then re-performed to update the device with a new configuration that specifies the new device unique identifier, and to notify management point systems about the change.

4.0 IMPLEMENTATION MECHANISMS

Hardware Overview

Figure 4:
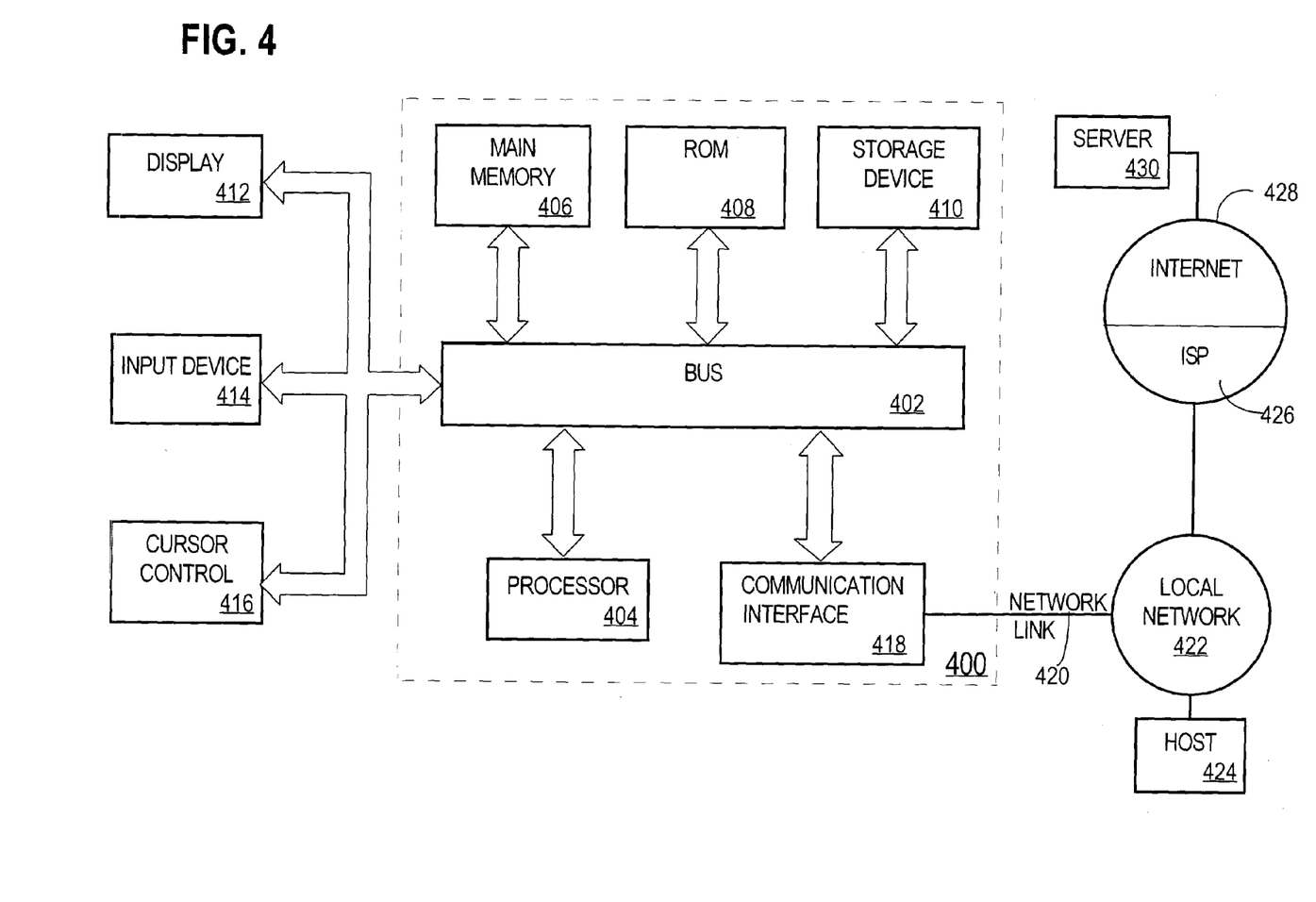
FIG. 4 is a block diagram that illustrates a computer system upon which an embodiment of the invention may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for synchronizing a unique identifier of a device. According to one embodiment of the invention, synchronizing a unique identifier of a device are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for synchronizing a unique identifier of a device as described herein.

The received code may be executed by processor 404 as it is received, and/or stored in storage device 410, or other non-volatile storage for later execution. In this manner, computer system 400 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX

ID Command Format cns id

To set the unique event ID or config ID router identifier used by Cisco Networking Services (CNS) services, use the cns id command in global configuration mode. To set the identifier to the router's host name, use the no form of this command.

If ID Choice Is IP Address or MAC Address cns id type number {dns-reverse|ipaddress|mac-address} [event]

no cns id type number {dns-reverse|ipaddress|mac-address} [event]

If ID Choice Is Anything Else ens id {hardware-serial|hostname|string string} [event]

no cns id {hardware-serial|hostname|string string} [event]

| Syntax Description | |
|---|---|
| type | Type of interface (for example, ethernet, group-async, loopback, or virtual-template) and the interface number. Indicates from which interface the IP or MAC address should be retrieved in order to define the unique ID. |
| number | |
| dns-reverse | (Optional) Uses DNS reverse lookup to retrieve the host name and assign it as the unique ID. |
| ipaddress | (Optional) Uses the IP address specified in the type number arguments as the unique ID. |
| mac-address | (Optional) Uses the MAC address specified in the type number arguments as the unique ID. |
| event | (Optional) Sets this ID to be the event ID value, used to identify the router for CNS event services. If omitted, sets it to be the config ID value, used to identify the router for CNS configuration services. |
| hardware-serial | (Optional) Uses the hardware serial number as the unique ID. |
| hostname | (Optional) Uses the host name as the unique ID. This is the system default. |
| string string | (Optional) Uses an arbitrary text string - typically the host name - as the unique ID. |

Defaults

The system defaults to the host name as the unique ID.

Event defaults to set the unique ID to be the config ID value.

Command Modes

Global configuration

Usage Guidelines

Use this command to retrieve (if necessary), set, and pass the unique ID to the CNS configuration agent, which then pulls the initial configuration template to the router during boot up.

You can set either or both of two IDs: the config ID value for CNS configuration services and the event ID value for CNS event services. To set both values, use the command twice. To set the CNS event ID to the router's host name, use the no form of this command with the event keyword. To set the CNS config ID to the router's host name, use the no form of this command without the event keyword.

Examples

The following example shows the host name of the router being passed as the config ID value:

Router(config)# cns id hostname

The following example shows the hardware serial number of the router being passed as the event ID value.

Router(config)# cns id hardware-serial event

What is claimed is:

1. A method for automatically synchronizing a unique identifier of a device, the method comprising the computer-implemented steps of:
   receiving a first device identifier that is assigned to the device by a manufacturer of the device as the unique identifier of the device;
   automatically receiving a second device identifier from a service provider associated with the device;
   automatically assigning the second device identifier as the unique identifier of the device; and
   automatically communicating a message to one or more systems indicating that the second device identifier is the unique identifier of the device;
   wherein the first device identifier is a chassis serial number for a chassis of the device and
   wherein the step of receiving the first device identifier further comprises the step of receiving the chassis serial number from the device.

2. A method for automatically synchronizing a unique identifier of a device, the method comprising the computer-implemented steps of:
   receiving a first device identifier that is assigned to the device by a manufacturer of the device as the unique identifier of the device;
   automatically receiving a second device identifier from a service provider associated with the device;
   automatically assigning the second device identifier as the unique identifier of the device; and
   automatically communicating a message to one or more systems indicating that the second device identifier is the unique identifier of the device;
   further comprising the step of receiving and executing a generic configuration at the device, wherein the generic configuration specifies a command for assigning the first device identifier as the unique identifier of the device;
   wherein the generic configuration is a bootstrap configuration and the step of executing the bootstrap configuration is performed in response to booting the device up.

3. A method as recited in claim 2, wherein the command instructs the device to use its hardware serial number or chassis identifier as the unique identifier of the device.

4. A method as recited in claim 2, wherein the command is a CLI command of the format "cns id hardware-serial" and wherein the "hardware-serial" sub string of the CLI command is replaced with the first device identifier.

5. A method as recited in claim 2, wherein the command is a CLI command of the format "cns id ipaddress" and wherein the "ipaddress" sub string of the CLI command is replaced with the first device identifier.

6. A method as recited in claim 2, wherein the command is a CLI command of the format "cns id mac-address" and wherein the "mac-address" sub string of the CLI command is replaced with the first device identifier.

7. A method as recited in claim 2, wherein the first device identifier is a MAC address associated with the device and wherein the step of receiving the first device identifier further comprises the step of retrieving the MAC address of the device.

8. A method as recited in claim 2, wherein the step of assigning the second device identifier further comprises the step of:
   receiving and executing a second configuration at the device, wherein the second configuration specifies a command for assigning the second device identifier as the unique identifier of the device.

9. A method as recited in claim 8, wherein the command instructs the device to use a specified string value as its unique identifier.

10. A method as recited in claim 8, wherein the command is a CLI command of the format "CNS ID STRING 'string'", and wherein the 'string' of the CLI command is replaced with the second device identifier.

11. A method as recited in claim 8, further comprising the steps of:
   transmitting the first device identifier to a configuration server associated with the service provider; and
   using the first device identifier to locate the second device identifier.

12. A method as recited in claim 8, further comprising the steps of:
   using the first device identifier to locate the second device identifier; and
   associating the second device identifier with the command that the second configuration specifies.

13. A method as recited in claim 12, wherein the step of using the first device identifier to locate the second device identifier further comprises the steps of:
   using the first device identifier to locate a device object for the device; and
   retrieving the second device identifier from the device object.

14. A method as recited in claim 2, wherein the step of communicating a message further comprises publishing an event on an application level broadcast medium.

15. A method as recited in claim 2, wherein a particular system of the one or more systems is a management point system, a billing system, a provisioning system, and a fault detection system.

16. A method as recited in claim 2, wherein the second device identifier is a unique administrative identifier associated with a subscriber of the device, and wherein the step of receiving the second device identifier from the service provider further comprises the step of receiving the unique administrative identifier from a management system of the service provider.

17. A method as recited in claim 2, wherein the second device identifier is a service provider identifier that uniquely identifies the device, and wherein the step of receiving the second device identifier further comprises the step of receiving the service provider identifier.

18. A method as recited in claim 2, further comprising the step of using the first device identifier to locate a third device identifier.

19. A method as recited in claim 18, wherein the third device identifier is a unique administrative identifier.

20. A method as recited in claim 18, wherein the step of using the first device identifier to locate the third device identifier further comprises the steps of:
- using the first device identifier to locate a device object for the device; and
- retrieving the third device identifier from the device object.

21. A computer-readable storage medium carrying one or more sequences of instructions for automatically synchronizing a unique identifier of a device, which instructions, when executed by one or more processors, cause the one or more processors to carry out the steps of:
- receiving a first device identifier that is assigned to the device by a manufacturer of the device as the unique identifier of the device;
- automatically receiving a second device identifier from a service provider associated with the device;
- automatically assigning the second device identifier as the unique identifier of the device; and
- automatically communicating a message to one or more systems indicating that the second device identifier is the unique identifier of the device;
- further comprising instructions, which when executed by the one or more processors, cause the one or more processors to carry out the step of receiving and executing a generic configuration at the device, wherein the generic configuration specifies a command for assigning the first device identifier as the unique identifier of the device
- wherein the generic configuration is a bootstrap configuration and the instructions for carrying out the step of executing the bootstrap configuration is performed in response to booting the device up.

22. A computer-readable storage medium as recited in claim 21, wherein the command instructs the device to use its hardware serial number or chassis identifier as the unique identifier of the device.

23. A computer-readable storage medium as recited in claim 21, wherein the command is a CLI command of the format "CNS ID HW-SER" and wherein the "HW-SER" sub string of the CLI command is replaced with the first device identifier.

24. A computer-readable storage medium carrying one or more sequences of instructions for automatically synchronizing a unique identifier of a device, which instructions, when executed by one or more processors, cause the one or more processors to carry out the steps of:
- receiving a first device identifier that is assigned to the device by a manufacturer of the device as the unique identifier of the device;
- automatically receiving a second device identifier from a service provider associated with the device;
- automatically assigning the second device identifier as the unique identifier of the device; and
- automatically communicating a message to one or more systems indicating that the second device identifier is the unique identifier of the device;
- wherein the first device identifier is a chassis serial number for a chassis of the device and wherein instructions for carrying out the step of receiving the first device identifier further comprise instructions for carrying out the step of receiving the chassis serial number from the device.

25. A computer-readable storage medium as recited in claim 21, wherein the first device identifier is a MAC address associated with the device and wherein instructions for carrying out the step of receiving the first device identifier further comprise instructions for carrying out the step of retrieving the MAC address of the device.

26. A computer-readable storage medium as recited in claim 21, wherein the instructions for carrying out the step of assigning the second device identifier further comprise instructions for carrying out the step of:
- receiving and executing a second configuration at the device, wherein the second configuration specifies a command for assigning the second device identifier as the unique identifier of the device.

27. A computer-readable storage medium as recited in claim 26, wherein the command instructs the device to use a specified string value as its unique identifier.

28. A computer-readable storage medium as recited in claim 26, wherein the command is a CLI command of the format "CNS ID STRING 'string'", and wherein the 'string' of the CLI command is replaced with the second device identifier.

29. A computer-readable storage medium as recited in claim 26, further comprising instructions, which when executed by the one or more processors, cause the one or more processors to carry out the steps of:
- transmitting the first device identifier to a configuration server associated with the service provider; and
- using the first device identifier to locate the second device identifier.

30. A computer-readable storage medium as recited in claim 26, further comprising instructions, which when executed by the one or more processors, cause the one or more processors to carry out the steps of:
- using the first device identifier to locate the second device identifier; and
- associating the second device identifier with the command that the second configuration specifies.

31. A computer-readable storage medium as recited in claim 30, wherein the instructions for carrying out the step of using the first device identifier to locate the second device identifier further comprise instructions for carrying out the steps of:
- using the first device identifier to locate a device object for the device; and
- retrieving the second device identifier from the device object.

32. A computer-readable storage medium as recited in claim 21, wherein the instructions for carrying out the step of communicating a message further comprise instructions for carrying out the step of publishing an event on an application level broadcast medium.

33. A computer-readable storage medium as recited in claim 21, wherein a particular system of the one or more systems is a management point system, a billing system, a provisioning system, and a fault detection system.

34. A computer-readable storage medium as recited in claim 21, wherein the second device identifier is a unique administrative identifier associated with a subscriber of the device, and wherein the instructions for carrying out the step of receiving the second device identifier from the service provider further comprise instructions for carrying out the step of receiving the unique administrative identifier from a management system of the service provider.

35. A computer-readable storage medium as recited in claim 21, wherein the second device identifier is a service provider identifier that uniquely identifies the device, and wherein the instructions for carrying out the step of receiving the second device identifier further comprise instructions for carrying out the step of receiving the service provider identifier.

36. A computer-readable storage medium as recited in claim 21, further comprising instructions, which when executed by the one or more processors, cause the one or more processors to carry out the step of using the first device identifier to locate a third device identifier.

37. A computer-readable storage medium as recited in claim 36, wherein the third device identifier is a unique administrative identifier.

38. A computer-readable storage medium as recited in claim 36, wherein the instructions for carrying out the step of using the first device identifier to locate the third device identifier further comprise instructions for carrying out the steps of:

using the first device identifier to locate a device object for the device; and     retrieving the third device identifier from the device object.

39. An apparatus for automatically synchronizing a unique identifier of a device, comprising:

a means for receiving a first device identifier that is assigned to the device by a manufacturer of the device as the unique identifier of the device;

a means for automatically receiving a second device identifier from a service provider associated with the device;

a means for automatically assigning the second device identifier as the unique identifier of the device; and     a means for automatically communicating a message to one or more systems indicating that the second device identifier is the unique identifier of the device;

further comprising a means for receiving and executing a generic configuration at the device, wherein the generic configuration specifies a command for assigning a first device identifier as the unique identifier of the device;

wherein the generic configuration is a bootstrap configuration and the means for executing the bootstrap configuration are employed in response to booting the device up.

40. An apparatus for automatically synchronizing a unique identifier of a device, comprising:

a processor; and one or more stored sequence of instructions, which when executed by the processor, cause the processor to carry out the steps of:

receiving a first device identifier that is assigned to the device by a manufacturer of the device as the unique identifier of the device;

automatically receiving a second device identifier from a service provider associated with the device;

automatically assigning the second device identifier as the unique identifier of the device; and     automatically communicating a message to one or more systems indicating that the second device identifier is the unique identifier of the device;

further comprising one or more stored sequence of instructions, which when executed by the processor, cause the processor to carry out the step of receiving and executing a generic configuration at the device, wherein the generic configuration specifies a command for assigning a first device identifier as the unique identifier of the device;

wherein the generic configuration is a bootstrap configuration and the instructions for carrying out the step of executing the bootstrap configuration are executed in response to booting the device up.

\* \* \* \* \*